US008997476B2

(12) United States Patent
Brinkman et al.

(10) Patent No.: US 8,997,476 B2
(45) Date of Patent: Apr. 7, 2015

(54) HYDRAULIC ENERGY RECOVERY SYSTEM

(75) Inventors: Jason Lee Brinkman, Peoria, IL (US); Wesley Thomas Payne, Plainfield, IL (US); Aristoteles Rosa Neto, St. Charles, IL (US)

(73) Assignee: Caterpillar Inc., Peoria, IL (US)

( * ) Notice: Subject to any disclaimer, the term of this patent is extended or adjusted under 35 U.S.C. 154(b) by 369 days.

(21) Appl. No.: 13/560,079

(22) Filed: Jul. 27, 2012

(65) Prior Publication Data

US 2014/0026550 A1 Jan. 30, 2014

(51) Int. Cl.

| | |
|---|---|
| ***F16D 31/02*** | (2006.01) |
| ***E02F 9/20*** | (2006.01) |
| ***E02F 9/22*** | (2006.01) |
| ***F15B 21/14*** | (2006.01) |
| *F15B 1/02* | (2006.01) |

(52) U.S. Cl.

CPC ............ *E02F 9/2217* (2013.01); *E02F 9/2095* (2013.01); *E02F 9/2285* (2013.01); *E02F 9/2292* (2013.01); *E02F 9/2296* (2013.01); *F15B 1/024* (2013.01); *F15B 21/14* (2013.01); *F15B 2211/20507* (2013.01); *F15B 2211/20546* (2013.01); *F15B 2211/20569* (2013.01); *F15B 2211/20576* (2013.01); *F15B 2211/212* (2013.01); *F15B 2211/30575* (2013.01); *F15B 2211/611* (2013.01); *F15B 2211/613* (2013.01); *F15B 2211/62* (2013.01); *F15B 2211/6306* (2013.01); *F15B 2211/6343* (2013.01); *F15B 2211/7058* (2013.01); *F15B 2211/761* (2013.01); *F15B 2211/88* (2013.01)

(58) Field of Classification Search

USPC .................................. 60/413, 414, 418, 456

See application file for complete search history.

(56) References Cited

U.S. PATENT DOCUMENTS

| | | | | |
|---|---|---|---|---|
| 6,151,894 | A | 11/2000 | Endo et al. | |
| 6,655,136 | B2 | 12/2003 | Holt et al. | |
| 6,789,387 | B2 | 9/2004 | Brinkman | |
| 7,240,486 | B2 | 7/2007 | Huang et al. | |
| 7,273,122 | B2 * | 9/2007 | Rose | 180/165 |
| 7,444,809 | B2 * | 11/2008 | Smith et al. | 60/414 |
| 7,712,309 | B2 | 5/2010 | Vigholm | |
| 8,024,924 | B2 | 9/2011 | Mueller et al. | |
| 2013/0318955 | A1 * | 12/2013 | Zhang et al. | 60/413 |

FOREIGN PATENT DOCUMENTS

WO WO 00/00748 1/2000

* cited by examiner

*Primary Examiner* — Michael Leslie

(74) *Attorney, Agent, or Firm* — Finnegan, Henderson, Farabow, Garrett & Dunner, LLP

(57) ABSTRACT

A machine includes a hydraulic cylinder configured to raise and lower a boom of the machine, and an accumulator selectively fluidly connected to the hydraulic cylinder. The accumulator is configured to receive fluid from the hydraulic cylinder during lowering of the boom. The machine also includes a hydraulic motor fluidly connected to the accumulator via an independent metering valve. The machine further includes a fan driven by the hydraulic motor and configured to assist in cooling fluid displaced from the hydraulic cylinder.

19 Claims, 5 Drawing Sheets

HYDRAULIC ENERGY RECOVERY SYSTEM

TECHNICAL FIELD

The present disclosure relates generally to a hydraulic system and, more particularly, to a hydraulic energy recovery system.

BACKGROUND

Machines such as, for example, wheel loaders, track type tractors, and other types of heavy machinery can be used for a variety of tasks. These machines include a power source, which may be, for example, an engine, such as a diesel engine, gasoline engine, or natural gas engine that provides the power required to complete such tasks. To effectively perform such tasks, the machines also include one or more implements, and at least one hydraulic pump driven by the power source. The hydraulic pump is typically fluidly connected to one or more hydraulic cylinders associated with each implement, and movement of each implement can be controlled by directing hydraulic fluid to and/or removing hydraulic fluid from such cylinders.

When an implement is lowered during performance of such tasks, the pressurized hydraulic fluid within the corresponding hydraulic cylinders is typically discharged to a fluid reservoir or tank. Such pressurized hydraulic fluid, however, contains energy that could be utilized by components of the machine to perform additional tasks. However, many known machines have no means of recovering such energy when the hydraulic cylinder is retracted during implement lowering. Instead, such machines typically throttle the fluid through one or more valves to control a lowering speed of the implement and/or a retracting speed of the hydraulic cylinder. This throttling results in a waste of energy and undesired heating of the hydraulic fluid as it passes to the tank. Additionally, this heat must eventually be removed by a cooling system of the machine, and as a result, such heat generation decreases the operational efficiency of the machine.

Some attempts have been made to recover this otherwise wasted energy. For example, International Publication No. WO 00/00748 discloses a system that recovers energy by providing an additional pump/motor with an over-center capability in the hydraulic circuit. The pump/motor transfers fluid between a lifting circuit and an accumulator for storing energy. However, when the lifting cylinder is dropped rapidly, a large quantity of fluid is discharged rapidly from the cylinder. To accommodate the fluid, the pump/motor needs to be large. Additionally, when the lifting cylinder is being retracted and the accumulator is at a higher pressure than the fluid discharged from the lift cylinder, additional energy from the engine is required to store the energy coining from the lift cylinder. Requiring such additional energy from the engine for the purposes of energy storage reduces the operational efficiency of the machine.

The disclosed systems and methods are directed to overcoming one or more of the problems set forth above and/or other problems of the prior art.

SUMMARY OF THE INVENTION

In an exemplary embodiment of the present disclosure, a machine includes a hydraulic cylinder configured to raise and lower a boom of the machine, and an accumulator selectively fluidly connected to the hydraulic cylinder. The accumulator is configured to receive fluid from the hydraulic cylinder during lowering of the boom. The machine also includes a hydraulic motor fluidly connected to the accumulator via an independent metering valve. The machine further includes a fan driven by the hydraulic motor and configured to assist in cooling fluid displaced from the hydraulic cylinder.

In another exemplary embodiment of the present disclosure, a machine includes a hydraulic system having a first pump driven by a power source of the machine, and a valve arrangement fluidly connected to the first pump. The machine also includes a recovery system having a second pump driven by the power source, an independent metering valve fluidly connected to the second pump, and an accumulator fluidly connected to the independent metering valve. The recovery system also includes a hydraulic motor fluidly connected to the accumulator via the independent metering valve. The machine further includes a hydraulic cylinder configured to raise and lower a boom of the machine. The hydraulic cylinder is selectively fluidly connected to the valve arrangement of the hydraulic system and the accumulator of the recovery system.

In yet another exemplary embodiment of the present disclosure, a method of controlling a machine includes lowering a boom of the machine with a hydraulic cylinder, wherein lowering the boom directs fluid from the hydraulic cylinder to an accumulator. The method also includes directing fluid from the accumulator to a pump fluidly connected to the accumulator via an independent metering valve. The method further includes directing pressurized fluid from the pump to a hydraulic motor fluidly connected to the independent metering valve, and directing fluid from the hydraulic motor to a heat exchanger via the independent metering valve.

DETAILED DESCRIPTION

Figure 1:
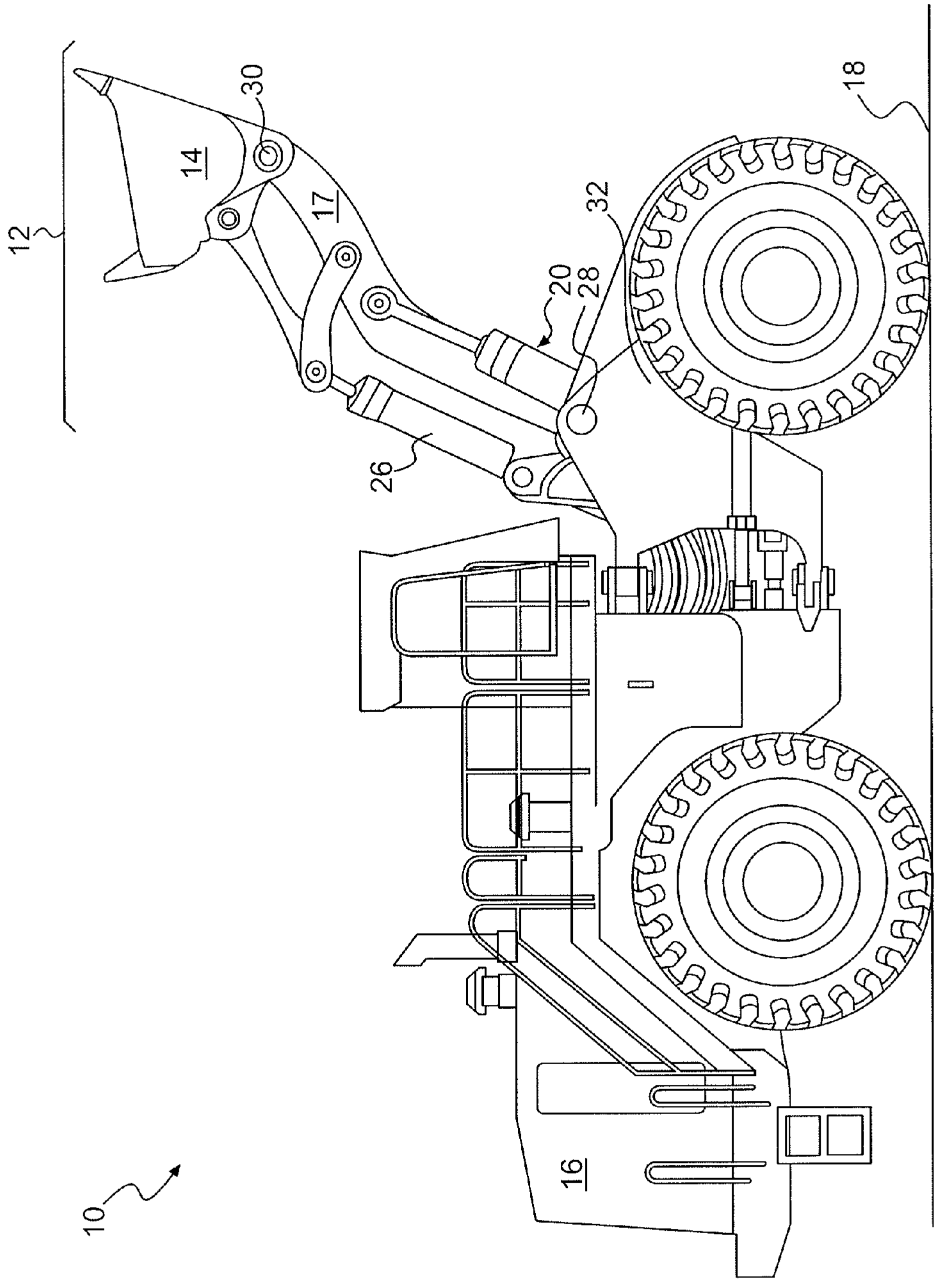
FIG. 1 illustrates an exemplary machine of the present disclosure.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be a material moving machine such as the loader depicted in FIG. 1. Alternatively, machine 10 could embody an excavator, a dozer, a backhoe, a motor grader, or another similar machine. Machine 10 may include, among other things, a linkage system 12 configured to move an implement 14, and a power source 16 that provides power to linkage system 12.

Linkage system 12 may include one or more structures acted on by corresponding fluid actuators to move implement 14. Specifically, linkage system 12 may include a boom (i.e., a lifting member) 17 that is vertically pivotable about a horizontal axis 28 relative to a ground surface 18 on which machine 10 is located by a pair of adjacent, double-acting, hydraulic cylinders 20 (only one shown in FIG. 1). Linkage system 12 may also include a single, double-acting, hydraulic cylinder 26 connected to tilt implement 14 relative to boom 17 in a vertical direction about a horizontal axis 30. Boom 17 may be pivotably connected at one end to a body 32 of machine 10, while implement 14 may be pivotably connected to an opposing end of boom 17. It should be noted that alternative linkage configurations may also be possible.

Numerous different implements 14 may be attachable to a single machine 10 and controlled to perform a particular task. For example, implement 14 could embody a bucket (shown in FIG. 1), a fork arrangement, a blade, a shovel, a ripper, a dump bed, a broom, a snow blower, a propelling device, a cutting device, a grasping device, or another task-performing device known in the art. Although connected in the embodiment of FIG. 1 to lift and tilt relative to machine 10, implement 14 may alternatively or additionally pivot, rotate, slide, swing, or move in any other appropriate manner.

Power source 16 may embody an engine such as, for example, a diesel engine, a gasoline engine, a gaseous fuel-powered engine, or another type of combustion engine known in the art that is supported by body 32 of machine 10 and operable to power the movements of machine 10 and implement 14. It is contemplated that the power source 16 may alternatively embody a non-combustion source of power, if desired, such as a fuel cell, a power storage device (e.g., a battery), or another source known in the art. Power source 16 may produce a mechanical or electrical power output that may then be converted to hydraulic power for moving hydraulic cylinders 20 and 26.

Figure 2:
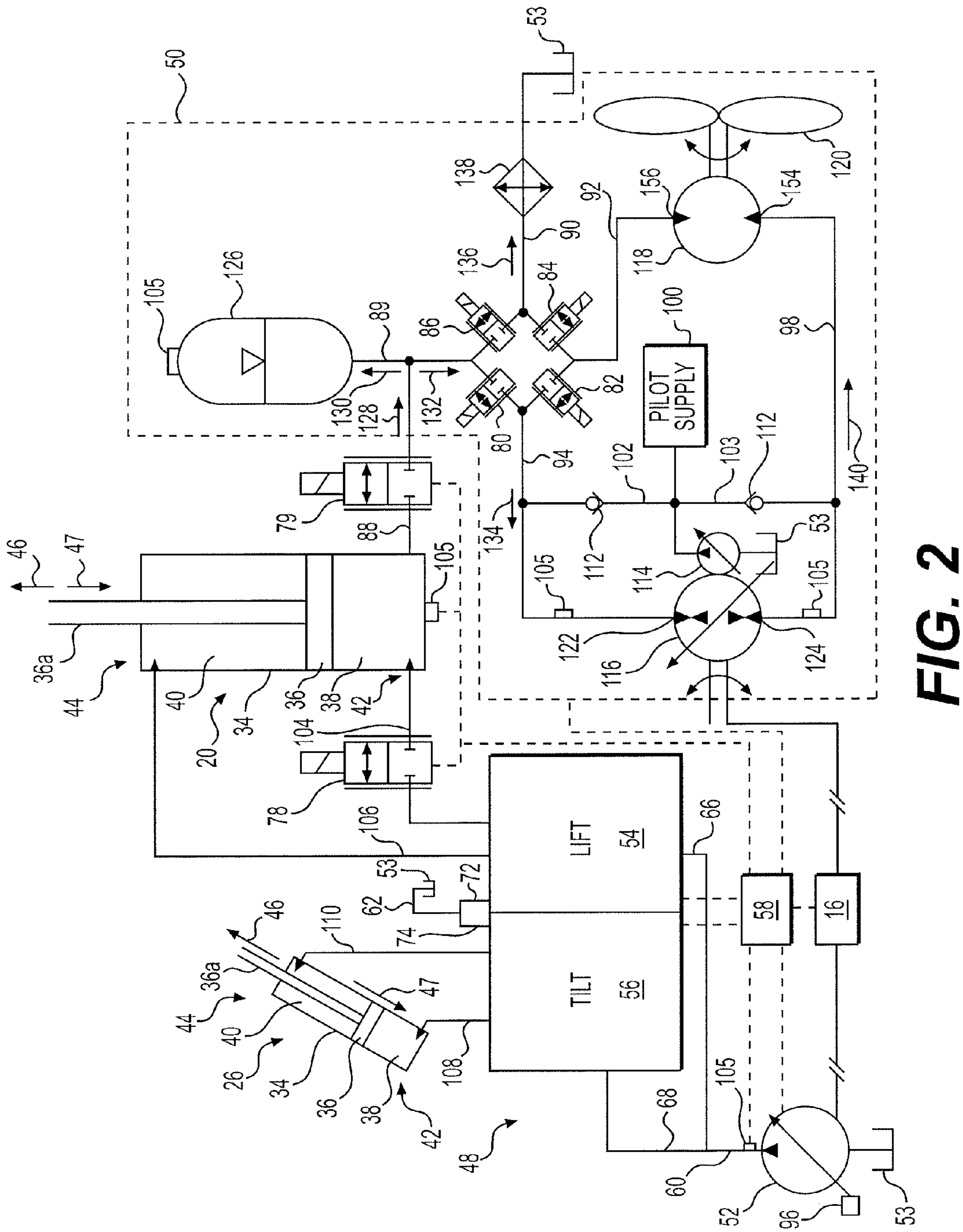
FIG. 2 illustrates an exemplary hydraulic system and an exemplary energy recovery system of the machine illustrated in FIG. 1.

For purposes of simplicity, FIG. 2 illustrates the composition and connections of only hydraulic cylinder 26 and one of hydraulic cylinders 20. It should be noted, however, that machine 10 may include other hydraulic actuators of similar composition connected to move the same or other structural members of linkage system 12 in a similar manner, if desired.

As shown in FIG. 2, each of hydraulic cylinders 20 and 26 may include a tube 34 and a piston assembly 36 arranged within tube 34 to form a first chamber 38 and a second chamber 40. In one example, a rod portion 36*a* of piston assembly 36 may extend through an end of second chamber 40. As such, second chamber 40 may be associated with a rod-end 44 of its respective cylinder, while first chamber 38 may be associated with an opposing head-end 42 of its respective cylinder.

First and second chambers 38, 40 may each be selectively supplied with pressurized fluid and drained of the pressurized fluid to cause piston assembly 36 to displace within tube 34, thereby changing an effective length of hydraulic cylinders 20, 26 and moving implement 14 (FIG. 1). A flow rate of fluid into and out of first and second chambers 38, 40 may relate to a velocity of hydraulic cylinders 20, 26 and implement 14, while a pressure differential between first and second chambers 38, 40 may relate to a force imparted by hydraulic cylinders 20, 26 on implement 14. An expansion (represented by an arrow 46) and a retraction (represented by an arrow 47) of hydraulic cylinders 20, 26 may function to assist in moving implement 14 in different manners. For example, expansion of hydraulic cylinder 20 may coincide with movement of the piston assembly 36 in the direction of arrow 46, and may lift or raise boom 17 as well as implement 14 connected thereto. Likewise, retraction of hydraulic cylinder 20 may coincide with movement of the piston assembly 36 in the direction of arrow 47, and may lower boom 17 and implement 14. Similar expansion and retraction of hydraulic cylinder 26 may function to tilt implement 14 in the fore and aft directions, respectively.

To help regulate filling and draining of first and second chambers 38, 40, machine 10 may include a hydraulic system 48 having a plurality of interconnecting and cooperating fluid components. Hydraulic system 48 may at least partially form a fluid circuit between hydraulic cylinders 20, 26, an engine-driven hydraulic pump 52, and a tank 53. Hydraulic system 48 may include a lift valve arrangement 54, a tilt valve arrangement 56, and, in some embodiments, one or more auxiliary valve arrangements (not shown) that are fluidly connected to receive and discharge pressurized fluid in parallel fashion. In one example, valve arrangements 54, 56 may include separate bodies bolted to each other to form a valve stack (not shown). In another embodiment, each of valve arrangements 54, 56 may be stand-alone arrangements, connected to each other only by way of external fluid conduits (not shown). It is contemplated that a greater number, a lesser number, or a different configuration of valve arrangements may be included within valve arrangements 54, 56, if desired. For example, a swing valve arrangement (not shown) configured to control a swinging motion of linkage system 12, one or more travel valve arrangements, and other suitable valve arrangements may be included within hydraulic system 48 and fluidly connected to valve arrangements 54, 56. Hydraulic system 48 may further include a controller 58 in communication with power source 16 and with valve arrangements 54, 56 to control power source fueling and movement of hydraulic cylinders 20, 26.

Each of lift and tilt valve arrangements 54, 56 may regulate the motion of their associated fluid actuators. Specifically, lift valve arrangement 54 may have elements movable to simultaneously control the motions of both of hydraulic cylinders 20 and thereby raise or lower boom 17 and implement 14 relative to ground surface 18. Likewise, tilt valve arrangement 56 may have elements movable to control the motion of hydraulic cylinder 26 and thereby tilt implement 14 relative to boom 17.

Valve arrangements 54, 56 may be connected to regulate separate flows of pressurized fluid to and from hydraulic cylinders 20, 26 via common passages. Specifically, valve arrangements 54, 56 may be connected to pump 52 by way of a common supply passage 60, and to tank 53 by way of a common drain passage 62. Lift and tilt valve arrangements 54, 56 may be connected in parallel to common supply passage 60 by way of individual fluid passages 66 and 68, respectively, and in parallel to common drain passage 62 by way of individual fluid passages 72 and 74, respectively. A pressure compensating valve (not shown) and/or a check valve (not shown) may be disposed within each of fluid passages 66, 68 to provide a unidirectional supply of fluid having a substantially constant flow to valve arrangements 54, 56. Such pressure compensating valves may be pre- or post-compensating valves movable, in response to a differential pressure, between a flow passing position and a flow blocking position such that a substantially constant flow of fluid is provided to valve arrangements 54 and 56, even when a pressure of the fluid directed to pressure compensating valves varies. It is contemplated that, in some applications, pressure compensating valves and/or check valves may be omitted, if desired.

Each of lift and tilt valve arrangements 54, 56 may be substantially identical and include at least one independent metering valve (IMV). In an exemplary embodiment, each of lift and tilt valve arrangements 54, 56 may include four IMVs. In such an exemplary embodiment (not shown), two of the four IMVs may be generally associated with fluid supply functions, while the remaining two IMVs may be generally associated with drain functions. For example, lift valve arrangement 54 may include a head-end supply valve, a rod-end supply valve, a head-end drain valve, and a rod-end drain valve. Similarly, tilt valve arrangement 56 may include a head-end supply valve, a rod-end supply valve, a head-end drain valve, and a rod-end drain valve. For example, with regard to the lift valve arrangement 54, a head-end supply valve may be disposed between fluid passage 66 and a fluid passage 104 that leads to first chamber 38 of hydraulic cylinder 20, and be configured to regulate a flow rate of pressurized fluid into first chamber 38 in response to a flow command from controller 58. A rod-end supply valve may be disposed between fluid passage 66 and a fluid passage 106 leading to second chamber 40 of hydraulic cylinder 20, and be configured to regulate a flow rate of pressurized fluid into second chamber 40 in response to a flow command from controller 58. A head-end drain valve may be disposed between fluid passage 104 and fluid passage 72, and be configured to regulate a flow rate of pressurized fluid from first chamber 38 of hydraulic cylinder 20 to tank 53 in response to a flow command from controller 58. A rod-end drain valve may be disposed between fluid passage 106 and fluid passage 72, and be configured to regulate a flow rate of pressurized fluid from second chamber 40 of hydraulic cylinder 20 to tank 53 in response to a flow command from controller 58.

Likewise, with regard to the tilt valve arrangement 56, a head-end supply valve may be disposed between fluid passage 68 and a fluid passage 108 that leads to first chamber 38 of hydraulic cylinder 26, and be configured to regulate a flow rate of pressurized fluid into first chamber 38 in response to a flow command from controller 58. A rod-end supply valve may be disposed between fluid passage 68 and a fluid passage 110 that leads to second chamber 40 of hydraulic cylinder 26, and be configured to regulate a flow rate of pressurized fluid into second chamber 40 in response to a flow command from controller 58. A head-end drain valve may be disposed between fluid passage 108 and fluid passage 74, and be configured to regulate a flow rate of pressurized fluid from first chamber 38 of hydraulic cylinder 26 to tank 53 in response to a flow command from controller 58. A rod-end drain valve may be disposed between fluid passage 110 and fluid passage 74, and be configured to regulate a flow rate of pressurized fluid from second chamber 40 of hydraulic cylinder 26 to tank 53 in response to a flow command from controller 58. Exemplary IMVs will be described in greater detail below with respect to an exemplary energy (hydraulic) recovery system 50 fluidly connected to hydraulic cylinder 20. The IMVs associated with the lift and tilt valve arrangements 54, 56 may be substantially identical to the IMVs associated with the energy recovery system 50.

In addition to the IMVs described above with respect to the lift valve arrangement 54, hydraulic system 48 may include one or more valves 78 configured to selectively fluidly connect a portion of hydraulic cylinder 20 with lift valve arrangement 54. For example, valve 78 may be disposed within fluid passage 104 between first chamber 38 and lift valve arrangement 54, and may be configured to regulate a flow rate of pressurized fluid passing between first chamber 38 and lift valve arrangement 54 in response to a flow command from controller 58. Valve 78 may include a variable-position, spring-biased valve element, for example a poppet or spool element, that is solenoid actuated and configured to move to any position between a first end-position at which fluid is allowed to flow into or out of first chamber 38, and a second end-position at which fluid is blocked from entering or exiting first chamber 38 via fluid passage 104. It is further contemplated that valve 78 may include additional or different elements than described above such as, for example, a fixed-position valve element or any other valve element known in the art. It is also contemplated that valve 78 may alternatively be hydraulically actuated, mechanically actuated, pneumatically actuated, or actuated in another suitable manner.

Pump 52 may have variable displacement and be load-sense controlled to draw fluid from tank 53 and discharge the fluid at a specified elevated pressure to valve arrangements 54, 56. That is, pump 52 may include a stroke-adjusting mechanism 96, for example a swashplate or spill valve, a position of which is hydro-mechanically adjusted based on a sensed load of hydraulic system 48 to thereby vary an output (e.g., a discharge rate) of pump 52. The displacement of pump 52 may be adjusted from a zero displacement position at which substantially no fluid is discharged from pump 52, to a maximum displacement position at which fluid is discharged from pump 52 at a maximum rate. In one embodiment, a load-sense passage (not shown) may direct a pressure signal to stroke-adjusting mechanism 96 and, based on a value of that signal (i.e., based on a pressure of signal fluid within the passage), the position of stroke-adjusting mechanism 96 may change to either increase or decrease the output of pump 52 and thereby maintain the specified pressure. In further exemplary embodiments, pump 52 may be configured to electronically control displacement. In such embodiments, the stroke-adjusting mechanism 96 and/or other components described above may be modified or omitted. Pump 52 may be drivably connected to power source 16 of machine 10 by, for example, a countershaft, a belt, or in another suitable manner. Alternatively, pump 52 may be indirectly connected to power source 16 via a torque converter, a gear box, an electrical circuit, or in any other manner known in the art. As a result of the connection between pump 52 and power source 16, changes in loading on pump 52 may be mechanically, electrically, and/or otherwise transmitted to power source 16 during operation of machine 10.

Tank 53 may constitute a reservoir configured to hold a supply of fluid. The fluid may include, for example, a dedicated hydraulic oil, an engine lubrication oil, a transmission lubrication oil, or any other fluid known in the art. One or more hydraulic circuits within machine 10, such as hydraulic system 48 and energy recovery system 50, may draw fluid from and return fluid to tank 53. It is also contemplated that hydraulic system 48 and energy recovery system 50 may be connected to multiple separate fluid tanks, if desired.

Energy recovery system 50 may include a plurality of interconnecting and cooperating fluid components configured to assist in capturing energy from hydraulic machine components, storing the energy, and utilizing the energy to assist the machine 10 in performing future tasks. For example, energy recovery system 50 may be configured to receive pressurized fluid displaced from first chamber 38 during lowering of boom 17 and/or implement 14. Fluid received from first chamber 38 may be stored by energy recovery system 50 and/or used by energy recovery system 50 to assist in operating a hydrostatic (hystat) motor and/or cooling fan of machine 10. By assisting in operating the motor and/or cooling fan, the energy recovery system 50 may reduce an overall torque demand typically associated with operation of the motor and/or cooling fan, and thus, may improve operational efficiency of machine 10.

In an exemplary embodiment, energy recovery system 50 may include, among other things, an accumulator 126, a hydraulic motor 118 fluidly connected to accumulator 126 via one or more IMVs, and a fan 120 driven by the hydraulic motor 118. For example, energy recovery system 50 may include four IMVs 80, 82, 84, 86. Energy recovery system 50 may also include a pump 116 fluidly connected to the hydraulic motor 118, and a heat exchanger 138 fluidly connected to the hydraulic motor 118 and/or the first chamber 38 via the one or more IMVs 80, 82, 84, 86. In an exemplary embodiment, the IMVs 80, 82, 84, 86, pump 116, and hydraulic motor 118 may be fluidly connected in a closed-loop manner, and together may comprise a hystat cooling circuit of machine 10. Alternatively, as will be discussed in greater detail below with respect to FIG. 5, in additional exemplary embodiments, pump 116, hydraulic motor 118, and/or heat exchanger 138 may be fluidly connected in an open-loop manner.

Accumulator 126 may be selectively fluidly connected to first chamber 38 via fluid passages 88, 89, and to components of energy recovery system 50 via fluid passage 89. Accumulator 126 may embody, for example, a compressed gas, membrane/spring, or bladder type of accumulator configured to receive pressurized fluid from and discharge pressurized fluid into fluid passage 89. For example, upon lowering boom 17 and/or implement 14, pressurized fluid may be displaced from first chamber 38 of hydraulic cylinder 20. Such displaced fluid may be directed into accumulator 126 via fluid passages 88 and 89. Fluid entering accumulator 126 may be stored therein, under pressure, until such fluid is controllably released in response to one or more signals received from controller 58. Accumulator 126 may include one or more dedicated valves or other like flow control devices to assist in controllably accepting fluid and/or controllably releasing fluid therefrom.

Alternatively, and/or in addition to such dedicated flow control devices, one or more valves 79 may be disposed within fluid passageway 88. Valve 79 may be configured to regulate flow between, for example, hydraulic cylinder 20 and accumulator 126 in response to one or more signals received from controller 58. In exemplary embodiments, valve 79 may be configured to direct fluid from first chamber 38 of hydraulic cylinder 20 to accumulator 126 and/or one or more of IMVs 80, 82, 84, 86 during lowering of boom 17 and/or implement 14. Valve 79 may include a variable-position, spring-biased valve element, for example a poppet or spool element, that is solenoid actuated and configured to move to any position between a first end-position at which fluid is allowed to flow, for example, out of first chamber 38 via fluid passage 88 and into fluid passage 89, and a second end-position at which fluid is blocked from, for example, flowing from first chamber 38 to fluid passage 89. It is further contemplated that valve 79 may include additional or different elements than described above such as, for example, a fixed-position valve element or any other valve element known in the art. It is also contemplated that valve 79 may alternatively be hydraulically actuated, mechanically actuated, pneumatically actuated, or actuated in another suitable manner. In exemplary embodiments, valve 79 may be substantially identical to valve 78.

IMVs 80, 82, 84, 86 may be fluidly connected to accumulator 126, and may be controlled to selectively fluidly connect accumulator 126 and/or first chamber 38 of hydraulic cylinder 20 with components of energy recovery system 50. In exemplary embodiments, IMVs 80, 82, 84, 86 may comprise a first supply valve 80, a second supply valve 82, a first drain valve 84, and a second drain valve 86. Supply valve 80 may be disposed between fluid passage 89 and a fluid passage 94 that leads to an inlet 122 of pump 116, and be configured to regulate a flow rate of pressurized fluid entering fluid passage 94 from fluid passage 89 in response to a flow command from controller 58. Supply valve 80 may include a variable-position, spring-biased valve element, for example a poppet or spool element, that is solenoid actuated and configured to move to any position between a first end-position (e.g. open) at which fluid is allowed to flow into fluid passage 94 from fluid passage 89, and a second end-position (e.g. closed) at which fluid from fluid passage 89 is blocked from entering fluid passage 94. It is contemplated that supply valve 80 may include additional or different elements than described above such as, for example, a fixed-position valve element or any other valve element known in the art. It is also contemplated that supply valve 80 may alternatively be hydraulically actuated, mechanically actuated, pneumatically actuated, or actuated in another suitable manner.

Supply valve 82 may be disposed between fluid passage 94 and a fluid passage 92 that leads to an outlet 156 of hydraulic motor 118, and be configured to regulate a flow rate of pressurized fluid passing between fluid passages 94 and 92 in response to a flow command from controller 58. Supply valve 82 may include a variable-position, spring-biased valve element, for example a poppet or spool element, that is solenoid actuated and configured to move to any position between a first end-position (e.g. open) at which fluid is allowed to flow between fluid passages 94 and 92, and a second end-position (e.g. closed) at which fluid is blocked from flowing between fluid passages 94 and 92. It is contemplated that supply valve 82 may include additional or different elements than described above such as, for example, a fixed-position valve element or any other valve element known in the art. It is also contemplated that supply valve 82 may alternatively be hydraulically actuated, mechanically actuated, pneumatically actuated, or actuated in another suitable manner.

Drain valve 84 may be disposed between fluid passage 92 and a fluid passage 90 that leads to heat exchanger 138, and be configured to regulate a flow rate of pressurized fluid passing from hydraulic motor 118 to heat exchanger 138 in response to a flow command from controller 58. Drain valve 84 may include a variable-position, spring-biased valve element, for example a poppet or spool element, that is solenoid actuated and configured to move to any position between a first end-position (e.g. open) at which fluid is allowed to flow from hydraulic motor 118 to heat exchanger 138, and a second end-position (e.g. closed) at which fluid is blocked from flowing from hydraulic motor 118 to heat exchanger 138. It is contemplated that drain valve 84 may include additional or different valve elements such as, for example, a fixed-position valve element or any other valve element known in the art. It is also contemplated that drain valve 84 may alternatively be hydraulically actuated, mechanically actuated, pneumatically actuated, or actuated in another suitable manner.

Drain valve 86 may be disposed between fluid passage 90 and fluid passage 89, and be configured to regulate a flow rate of pressurized fluid passing between fluid passages 89 and 90 in response to a flow command from controller 58. Drain valve 86 may include a variable-position, spring-biased valve element, for example a poppet or spool element, that is solenoid actuated and configured to move to any position between a first end-position (e.g. open) at which fluid is allowed to flow from passage 89 to passage 90, and a second end-position (e.g. closed) at which fluid is blocked from flowing from passage 89 to passage 90. It is contemplated that drain valve 86 may include additional or different valve elements such as, for example, a fixed-position valve element or any other valve element known in the art. It is also contemplated that drain valve 86 may alternatively be hydraulically actuated, mechanically actuated, pneumatically actuated, or actuated in another suitable manner.

Pump 116 may have a variable displacement and be controlled to draw fluid from components of energy recovery system 50 and discharge the fluid at a specified elevated pressure back to components of energy recovery system 50.

In exemplary embodiments, pump 116 may include a displacement controller (not shown) such as a swashplate and/or other like stroke-adjusting mechanism. The position of various components of the displacement controller may be electro-hydraulically and/or hydro-mechanically adjusted based on, among other things, a demand, desired speed, desired torque, and/or load of hydraulic motor 118 to thereby change a displacement (e.g., a discharge rate) of pump 116. In exemplary embodiments, the displacement controller may change the displacement of pump 116 in response to a desired speed of hydraulic motor 118, a desired speed of fan 120, and/or a desired reduction in temperature of fluid passing through heat exchanger 138. The displacement of pump 116 may be varied from a zero displacement position at which substantially no fluid is discharged from pump 116, to a maximum displacement position in a first direction at which fluid is discharged from pump 116 at a maximum rate into a fluid passage 98 via an outlet 124 of pump 116. Likewise, the displacement of pump 116 may be varied from the zero displacement position to a maximum displacement position in a second (i.e., reverse) direction at which fluid is discharged from pump 116 at a maximum rate into fluid passage 94 via inlet 122. Pump 116 may be drivably connected to power source 16 of machine 10 by, for example, a countershaft, a belt, or in another suitable manner. Alternatively, pump 116 may be indirectly connected to power source 16 via a torque converter, a gear box, an electrical circuit, or in any other manner known in the art. It is contemplated that pumps 116 and 52 may be connected to power source 16 in tandem (e.g., via the same shaft) or in parallel (via a gear train), as desired.

In some operating conditions, pump 116 may be selectively operated as a motor. More specifically, when the pressure of a flow of fluid provided to pump 116 by accumulator 126 and/or hydraulic cylinder 20 exceeds, for example, a demand associated with hydraulic motor 118, the elevated pressure of the fluid directed to pump 116 may function to drive pump 116 to rotate with or without assistance from power source 16. Under some circumstances, pump 116 may even be capable of imparting energy to power source 16, thereby improving an efficiency and/or capacity of power source 16.

In exemplary embodiments, energy recovery system 50 may further include a charge circuit associated with pump 116 and configured to provide makeup fluid to pump 116 during situations in which no pressurized fluid is provided to pump 116 from accumulator 126. In exemplary embodiments, such makeup fluid may be provided to pump 116 to compensate for fluid made unavailable to pump 116 due to pump and/or motor leakage, as well as fluid lost during processing (e.g. cooling) through heat exchanger 138. Such an exemplary charge circuit may include a charge pump 114 fluidly connected to pump 116, in parallel, via fluid passages 102, 103. Charge pump 114 may embody, for example, an engine-driven, fixed or variable displacement pump configured to draw fluid from tank 53, pressurize the fluid, and discharge the fluid into one or both of fluid passages 102, 103. In additional exemplary embodiments, the charge circuit may also include an accumulator (not shown) similar to accumulator 126, and configured to receive and/or discharge pressurized fluid so as to aid the functionality of pump 116. The charge circuit may also include a pilot supply 100 of the machine 10. Pilot supply 100 may comprise, for example, a supply of pressurized fluid configured to assist in controlling actuators associated with charge pump 114, IMVs 80, 82, 84, 86, and/or other actuators associated with components of machine 10. In additional exemplary embodiments, one or both of fluid passages 102, 103 may also include respective check valves 112 configured to regulate the direction of fluid flow within fluid passages 102, 103.

Hydraulic motor 118 may be driven by a fluid pressure differential. Specifically, hydraulic motor 118 may include first and second chambers (not shown) located to either side of a pumping mechanism such as an impeller, plunger, or series of pistons (not shown). When the first chamber is filled with pressurized fluid and the second chamber is drained of fluid, the pumping mechanism may be urged to move or rotate in a first direction. Conversely, when the first chamber is drained of fluid and the second chamber is filled with pressurized fluid, the pumping mechanism may be urged to move or rotate in an opposite direction. The flow rate of fluid into and out of the first and second chambers may determine an output velocity of hydraulic motor 118, while a pressure differential across the pumping mechanism may determine an output torque. It is contemplated that a displacement of hydraulic motor 118 may be variable, if desired, such that for a given flow rate and/or pressure of supplied fluid, a speed and/or torque output of hydraulic motor 118 may be adjusted. As described above, hydraulic motor 118 may comprise a motor connected to and/or otherwise associate with a hystat system of machine 10. In additional exemplary embodiments, hydraulic motor 118 may be an overcenter-type motor configured to changing output rotating directions in response to a change in the flow direction of fluid received from pump 116. For example, pump 116 may direct pressurized fluid, in a first direction, to an inlet 154 of hydraulic motor 118 via fluid passage 98. Such fluid flow may cause rotation of an output shaft of hydraulic motor 118 in a first or clockwise direction. Alternatively, pump 116 may direct pressurized fluid, in a second direction opposite the first direction, to the outlet 156 of hydraulic motor 118 via fluid passage 92. Such fluid flow may cause rotation of the output shaft of hydraulic motor 118 in a second or counterclockwise direction.

Fan 120 may be connected to hydraulic motor 118 via the output shaft or other like hydraulic motor output component. In exemplary embodiments, fan 120 may comprise a hystat cooling fan mechanically driven by hydraulic motor 118. Fan 120 may be configured to direct a flow of air across heat exchanger 138 and/or power source 16 for heat transfer therewith. In exemplary embodiments, fan 120 may be disposed proximate heat exchanger 138 and/or power source 16 to facilitate such heat transfer. Fan 120 may be directly connected to hydraulic motor 118, for example by way of a fixed mechanical connection with the output shaft of hydraulic motor 118. Alternatively, fan 120 may be indirectly mechanically connected to hydraulic motor 118 and driven by way of a belt-and-pulley system, by way of a gear reduction system, or in another appropriate manner. In either the direct or indirect connection configurations, fan 120 may rotate in a fixed-ratio relationship relative to a speed of hydraulic motor 118. That is, the ratio of hydraulic motor output speed to fan speed may remain fixed, regardless of the type of connection between fan 120 and hydraulic motor 118.

As shown in FIG. 2, heat exchanger 138 may be disposed in fluid passage 90 between IMVs 80, 82, 84, 86 and tank 53. Heat exchanger 138 may embody a radiator, hydraulic fluid cooler, and/or other like component configured to reduce a temperature of a fluid flowing therethrough via conductive and/or convective heat transfer. Heat exchanger 138 may be configured to dissipate heat from, for example, hydraulic fluid used to extend and retract hydraulic cylinders 20, 26 after such fluid passes through and absorbs heat from hydraulic cylinders 20, 26, valves associated with such hydraulic cylinders 20, 26, and/or other like components. In exemplary embodiments, heat exchanger 138 may be a liquid-to-air type of exchanger. That is, the flow of air generated by fan 120 may be directed through channels of heat exchanger 138 such that heat from the hydraulic fluid in adjacent channels is transferred to the air. In this manner, the hydraulic fluid passing through heat exchanger 138 may be cooled to below a predetermined temperature threshold prior to the hydraulic fluid passing to tank 53. In exemplary embodiments, the reduction in temperature of hydraulic fluid passing through heat exchanger 138 may be based on, among other things, the rotational speed of fan 120, the rotational speed of an output of hydraulic motor 118, a displacement of pump 116, a pressure of fluid directed to hydraulic motor 118 by pump 116, and/or other like operating characteristics of machine 10. For example, as the rotational speed of fan 120 increases, a greater reduction in a temperature of hydraulic fluid passing through heat exchanger 138 may occur. It is contemplated that an additional heat exchanger (not shown), for example an air-to-air heat exchanger, may be associated with power source 16 of machine 10 to provide for cooling of combustion air, if desired.

Controller 58 may embody a single microprocessor or multiple microprocessors that include components for controlling valve arrangements 54, 56, IMVs 80, 82, 84, 86, valves 78 79, and/or other components of machine 10 based on, among other things, input from an operator of machine 10 and/or one or more sensed values. Numerous commercially available microprocessors can be configured to perform the functions of controller 58. It should be appreciated that controller 58 could readily be embodied in a general machine microprocessor capable of controlling numerous machine functions. Controller 58 may include a memory, a secondary storage device, a processor, and any other components for running an application. Various other circuits may be associated with controller 58 such as power supply circuitry, signal conditioning circuitry, solenoid driver circuitry, and other types of circuitry.

Controller 58 may receive operator input and/or requests associated with a desired movement of implement 14 by way of one or more operator interface devices (not shown) that are located within an operator station of machine 10. Operator interface devices may embody, for example, single or multi-axis joysticks, levers, or other known interface devices located proximate an onboard operator seat (if machine 10 is directly controlled by an onboard operator) or located within a remote station offboard machine 10. Each operator interface device may be a proportional-type device that is movable through a range from a neutral position to a maximum displaced position. Such movement may generate a corresponding position and/or displacement signal that is indicative of a desired implement movement. In addition, a rate of movement (i.e., a position change rate) of operator interface device may be indicative of a desired velocity of implement 14 caused by hydraulic cylinders 20, 26, for example desired lift and tilt velocities of implement 14. The desired lift and tilt velocity signals may be generated independently or simultaneously by the same or different operator interface devices, and be directed to controller 58 for further processing.

In some embodiments, a mode button or other similar activating component may be associated with operator interface devices and utilized by the operator of machine 10 to initiate machine operation in a particular mode. For example, a mode button may be located on the same operator interface device utilized to request particular lift and/or tilt velocities, and be selectively activated by the operator to implement a mode of operation that fixes a relationship between implement lifting and tilting so as to alleviate tilt adjusting required by the operator during lifting. This fixed relationship mode of operation may be commonly known as parallel lift, and function to maintain a particular angle of implement 14 relative to ground surface 18 during lifting without the operator being required to simultaneously correct the naturally occurring implement tilt. The same or another button associated with interface devices may be utilized by the operator to set the particular angle maintained during parallel lift. For example, the operator may move implement 14 to a desired orientation, and then activate mode button to indicate the current orientation is the desired orientation.

One or more maps relating the interface device signals, the corresponding desired implement velocities, associated flow rates, pressures, and/or flow requests, valve element positions, pump pressures, speeds, and/or flow rates, modes of operation, operator interface device positions, operator interface device position change rates, and/or other parameters may be stored in the memory of controller 58. In addition to the exemplary rotational speed of fan 120, rotational speed of an output of hydraulic motor 118, displacement of pump 116, and pressure of fluid directed to hydraulic motor 118 by pump 116, collectively, such parameters may be referred to herein as "operating characteristics" of machine 10, and one or more such operating characteristics of machine 10 may measured, sensed, calculated, and/or otherwise determined by one or more sensors of machine 10 in an open-loop or closed-loop manner. Such operating characteristics are not limited to those listed above, and such sensors will be described in greater detail below. Each of the maps described herein may be in the form of tables, graphs, and/or equations. Controller 58 may be configured to allow the operator to directly modify these maps and/or to select specific maps from available relationship maps stored in the memory of controller 58 to affect actuation of hydraulic cylinders 20, 26. It is also contemplated that the maps may be automatically selected for use by controller 58 based on sensed or determined modes of machine operation, if desired.

Controller 58 may be configured to receive inputs and/or operator requests from interface device, and to command operation of valve arrangements 54, 56 in response to the inputs and/or requests based on the relationship maps described above. Specifically, controller 58 may receive the interface device signals indicative of desired implement movement, and reference the selected and/or modified relationship maps stored in the memory of controller 58 to determine desired flow rates for the appropriate supply and/or drain elements within valve arrangements 54, 56. The desired flow rates can then be commanded of the appropriate supply and drain elements to cause filling of particular chambers within hydraulic cylinders 20, 26 at rates that correspond with the desired implement velocities in the selected operational mode.

Controller 58 may also receive signals and/or information from one or more sensors during operation of machine 10. The information may include, for example, sensory information regarding the lift velocity and movement of implement 14 relative to ground surface 18. The information may also include sensory information regarding a position of operator interface, a position change rate associated with the operator interface device, pump pressure, pump speed, and/or other operating characteristics indicative of a load placed on implement 14. Such operating characteristics may include, for example, hydraulic pressures associated with one or more of the hydraulic cylinders 20, 26, valve arrangements 54, 56, fluid passages 66, 68, accumulator 126, fluid passages 88, 89, 90, 92, 94, 98, and other components of hydraulic system 48 and/or energy recovery system 50.

For example, in the embodiment shown in FIG. 2, velocity, pressure, and/or other information may be provided to controller 58 by way of one or more sensors 105 associated with hydraulic cylinders 20 and accumulator 126. Additional like sensors 105 may be associated with any of the other components of hydraulic system 48 and/or energy recovery system 50, and such additional sensors 105 may be in communication with controller 58.

In exemplary embodiments, sensors 105 associated with hydraulic cylinders 20, 26 may each embody a magnetic pickup-type sensor associated with a magnet (not shown) embedded within the piston assembly 36 of the different hydraulic cylinders 20, 26. In this configuration, sensors 105 associated with hydraulic cylinders 20, 26 may each be configured to detect an extension position of the corresponding hydraulic cylinder 20, 26 by monitoring the relative location of the magnet, and generate corresponding position signals directed to controller 58 for further processing. It is contemplated that such sensors 105 may alternatively embody other types of sensors such as, for example, magnetostrictive-type sensors associated with a wave guide (not shown) internal to hydraulic cylinders 20, 26, cable type sensors associated with cables (not shown) externally mounted to hydraulic cylinders 20, 26, internally- or externally-mounted optical sensors, rotary style sensors associated with joints pivotable by hydraulic cylinders 20, 26, or any other type of sensors known in the art. From the position signals generated by sensors 105 associated with hydraulic cylinders 20, 26, and based on known geometry and/or kinematics of hydraulic cylinders 20, 26 and linkage system 12, controller 58 may be configured to calculate the lift velocity and orientation of implement 14 relative to body 32 and/or ground surface 18.

It is also understood that the pressure of hydraulic system 48 and energy recovery system 50 may be directly or indirectly measured by way of sensors 105 associated with fluid passages and/or components of the respective systems 48, 50. For example, such sensors 105 may be associated with accumulator 126, common supply passage 60, fluid passages 94, 98, and/or any of the fluid passages described herein. In such embodiments, sensors 105 may embody any type of sensor configured to generate a signal indicative of a hydraulic pressure. For example, such sensors 105 may be strain gauge-type, capacitance-type, or piezo-type compression sensors configured to generate a signal proportional to a compression of an associated sensor element by fluid in communication with the sensor element. Signals generated by such sensors 105 may be directed to controller 58 for further processing.

Figure 5:
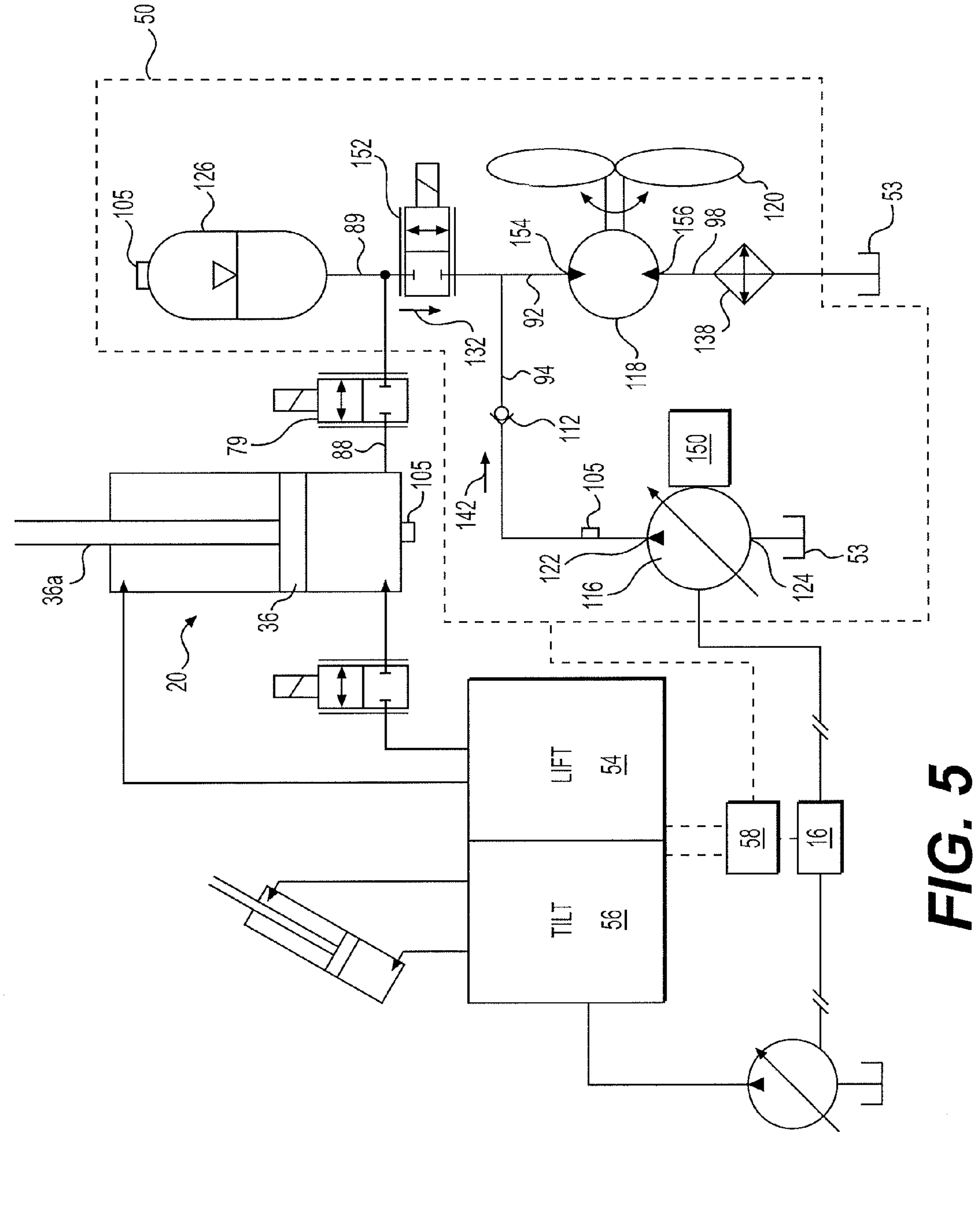
FIG. 5 illustrates another configuration of the exemplary hydraulic and energy recovery systems shown in FIG. 2.

As shown in FIG. 5, in additional exemplary embodiments, energy recovery system 50 may comprise an open-loop hydraulic circuit including pump 116, hydraulic motor 118, heat exchanger 138, and/or other components of energy recovery system 50 described above. In such open-loop embodiments, displacement of pump 116 may be controlled by an electronic pressure-reducing valve (EPRV) 150 connected to pump 116. EPRV 150 may receive a control signal from controller 58, and may affect a desired displacement of pump 116 based on the signal. Such a signal may control fan and/or hydraulic motor speed by increasing or decreasing the pressure of hydraulic fluid directed to hydraulic motor 118 by pump 122. In the embodiment of FIG. 5, such fluid may be directed to inlet 154 of hydraulic motor 118 via fluid passage 92, and may pass from outlet 156 to heat exchanger 138 via fluid passage 98. Additionally, the signal sent to EPRV 150 by controller 58 may control a flow of fluid passing from accumulator 126 to hydraulic motor 118. Such a flow of fluid from accumulator 126 may supplement fluid directed to hydraulic motor 118 from pump 116. For example, if accumulator 126 contains pressurized fluid received from hydraulic cylinder 20, such fluid may be used to supplement fluid provided to hydraulic motor 118 by pump 116 by directing EPRV 150 to reduce displacement of pump 116. By reducing displacement of pump 116 such that a pressure in fluid passage 94 is less than a pressure within accumulator 126, stored fluid may be directed from accumulator 126 to hydraulic motor 118 via fluid passages 89 and 92.

The exemplary open-loop energy recovery system 50 of FIG. 5 may include an additional valve 152 configured to regulate the flow of pressurized fluid, for example, from accumulator 126 and/or hydraulic cylinder 20 to hydraulic motor 118. Valve 152 may be disposed within fluid passage 89 or 92, and may be configured to regulate the flow of pressurized fluid in response to one or more signals from controller 58. In exemplary embodiments, valve 152 may include a variable-position, spring-biased valve element, for example a poppet or spool element, that is solenoid actuated and configured to move to any position between a first end-position (e.g. open) at which fluid is allowed to flow, for example, out of accumulator 126 and/or hydraulic cylinder 20 into hydraulic motor 118, and a second end-position (e.g. closed) at which fluid is blocked from, for example, flowing out of accumulator 126 and/or hydraulic cylinder 20 into hydraulic motor 118. It is further contemplated that valve 152 may include additional or different elements than described above such as, for example, a fixed-position valve element or any other valve element known in the art. It is also contemplated that valve 152 may alternatively be hydraulically actuated, mechanically actuated, pneumatically actuated, or actuated in another suitable manner. In exemplary embodiments, valve 152 may comprise an IMV and may be substantially identical to valve 78.

INDUSTRIAL APPLICABILITY

The disclosed systems and methods may be implemented into any mobile machine where fluid is displaced from a hydraulic cylinder when the hydraulic cylinder is retracted. For example, the disclosed systems and methods may be used to recover energy from hydraulic fluid that is displaced from one or more hydraulic cylinders as the hydraulic cylinders are retracted. Whereas such energy may be lost in other known systems, and may result in undesired heating of the hydraulic fluid as it returns to a low-pressure tank, the systems and methods described herein may capture this energy by directing the displaced hydraulic fluid to accumulator 126 for later use. By storing such fluid in accumulator 126 under pressure, the fluid may be controllably released from accumulator 126 to assist in, for example, operating hydraulic motor 118 and fan 120. In exemplary embodiments, fluid directed to hydraulic motor 118 from accumulator 126 may reduce the torque demand placed on pump 116 by hydraulic motor 118. Such a torque demand may be associated with a desired operating speed of fan 120 and/or a corresponding amount of cooling provided by fan 120 to heat exchanger 138. Accordingly, the systems and methods described herein may help improve machine efficiency by minimizing the torque demand on pump 116, and thereby reducing a corresponding torque demand placed on power source 16 by pump 116. In exemplary embodiments, pump 116, hydraulic motor 118, and fan 120 may be components of a hystat cooling circuit of machine 10, and pump 116 and motor 118 may be adapted to accept relatively high-pressure flows of hydraulic fluid at respective inlets 122, 154 and outlets 124, 156 thereof. Exemplary methods of controlling machine 10, hydraulic system 48, and energy recovery system 50 will now be described with respect to FIGS. 2-5.

During operation of machine 10, a machine operator may manipulate one or more operator interface devices to request lifting and/or tilting movements of boom 17 and/or implement 14. For example, the operator may move an interface device in the fore/aft direction to request lifting of boom 17 and/or implement 14 downward (i.e., lowering) toward ground surface 18 with the force of gravity and upward (i.e., raising) away from ground surface 18 against the force of gravity, respectively. The operator may also move an interface device in the left/right direction to request a rearward tilting (i.e., racking) of implement 14 and a forward tilting (i.e., dumping) of implement 14, respectively. Requests from the operator indicative of a desired movement of boom 17 and/or implement 14 may be generated by the operator interface device and/or any of the sensors 105 described herein, and such requests may be directed to and/or received by controller 58. Controller 58 may input information contained in such requests into one or more maps, look-up tables, graphs, and/or equations stored in a memory thereof, and may generate an output control signal based on such inputs. Such control signals may be sent to, for example, lift and tilt valve arrangements 54, 56 to affect desired movement of hydraulic cylinders 20, 26.

In the embodiment shown in FIG. 2, when lowering of boom 17 is requested by the operator, controller 58 may send a signal to lift valve arrangement 54 causing fluid to be directed to second chamber 40 via fluid passage 106. As fluid enters second chamber 40, piston assembly 36 may move in the direction of arrow 47, and pressurized fluid may be displaced from first chamber 38. A portion of the fluid exiting first chamber 38 may return to lift valve arrangement 54 via fluid passage 104. A remainder of this fluid may be directed to fluid passage 89, in the direction of arrow 128, via fluid passage 88 and valve 79. In exemplary embodiments, all of the fluid entering fluid passage 89 may be directed to accumulator 126 in the direction of arrow 130. IMVs 80 and 86 may be closed to assist in directing such fluid to accumulator 126. By accepting pressurized fluid displaced from first chamber 38 of hydraulic cylinder 20, and storing such fluid therein under a variable pressure, accumulator 126 may assist in capturing energy from such fluid that may otherwise be lost. Additionally, by storing fluid displaced from first chamber 38 at a variable pressure, unwanted increases in the temperature of such fluid caused by throttling such fluid may be avoided.

In exemplary embodiments in which accumulator 126 has a sufficient volume of pressurized fluid stored therein from previous boom lowering events, accumulator 126 may be controlled to selectively release such fluid in order to assist pump 116 in driving hydraulic motor 118. Passage of such pressurized fluid from accumulator 126 may be affected by controller 58 by opening IMV 80 while maintaining IMVs 82 and 86, and valve 79, in a closed position. If pressure in fluid passage 94 is less than pressure in accumulator 126, pressurized fluid from accumulator 126 may be directed to IMV 80 in the direction of arrow 132. Such fluid may pass through IMV 80 to fluid passage 94, and may pass to pump 116, in the direction of arrow 134, via fluid passage 94. Such pressurized fluid may assist in driving pump 116 and may, thus, reduce a torque demand placed on power source 16 by pump 116. In exemplary embodiments in which such pressurized fluid drives pump 116 in excess of a required speed, torque, and/or displacement, pump 116 may direct excess torque back to power source 16. In such, exemplary embodiments, pump 116 may act as a motor and may at least temporarily assist in driving power source 16.

Pump 116 may pressurize fluid passing therethrough and direct the pressurized fluid to inlet 154 of hydraulic motor 118, in the direction of arrow 140, via fluid passage 98. Fluid provided to hydraulic motor 118 may drive hydraulic motor 118, and may thereby rotate fan 120 connected thereto. It is understood that hydraulic motor 118 may place a torque demand on pump 116 corresponding to a desired level of hydraulic fluid cooling to be affected by fan 120. Pump 116 may, in turn, place a torque demand on power source 16 corresponding to a torque required by pump 116 to satisfy the torque demand of hydraulic motor 118. Directing fluid from accumulator 126 to pump 116 via IMV 80 may, however, reduce the torque demand of pump 116, and thus, the overall parasitic load on power source 16. Fluid received by hydraulic motor 118 from pump 116 may pass through fluid passage 92 and IMV 84 to fluid passage 90. Such fluid may be directed to heat exchanger 138 for cooling, in the direction of arrow 136, via fluid passage 90, and may then return to tank 53. As described above, fan 120 may direct a flow of air across heat exchanger 138 to remove heat from fluid passing through heat exchanger 138. Accordingly, fluid passing through heat exchanger 138 may be cooled prior to passing to tank 53. Additionally, in the exemplary embodiment of FIG. 2, fan 120 may be driven by hydraulic motor 118 at any speed necessary to accommodate variable cooling needs of, for example, heat exchanger 138. During such operation, torque provided to pump 116 by power source 16 may be varied based on the pressure of fluid being provided to pump 116 by accumulator 126. It is understood that as fluid is discharged from accumulator 126, the pressure of such fluid directed to pump 116 from accumulator 126 may decrease. Thus, to satisfy a given torque demand of the hydraulic motor 118, torque provided to pump 116 by power source 16 may correspondingly increase.

In further exemplary embodiments, and depending on the volume and/or flow rate of fluid entering fluid passage 89 and the available storage capacity of accumulator 126, a portion of the fluid entering fluid passage 89 in the direction of arrow 128 may be directed to pump 116. For example, if accumulator 126 does not have sufficient storage capacity to accept all of the fluid exiting first chamber 38 via fluid passage 88, such fluid not accepted by accumulator 126 may be directed to IMV 80 in the direction of arrow 132. Such fluid may pass through IMV 80 to fluid passage 94, and IMVs 86 and 82 may be closed to facilitate the passage of such fluid to fluid passage 94. This fluid may pass to pump 116, in the direction of arrow 134, via fluid passage 94. Pump 116 may pressurize this fluid and direct the pressurized fluid to inlet 154 of hydraulic motor 118, in the direction of arrow 140, via fluid passage 98. Upon driving hydraulic motor 118, such fluid may pass through fluid passage and open IMV 84 to fluid passage 90. Such fluid may be directed to heat exchanger 138 for cooling, in the direction of arrow 136, via fluid passage 90, and may then return to tank 53.

Figure 3:
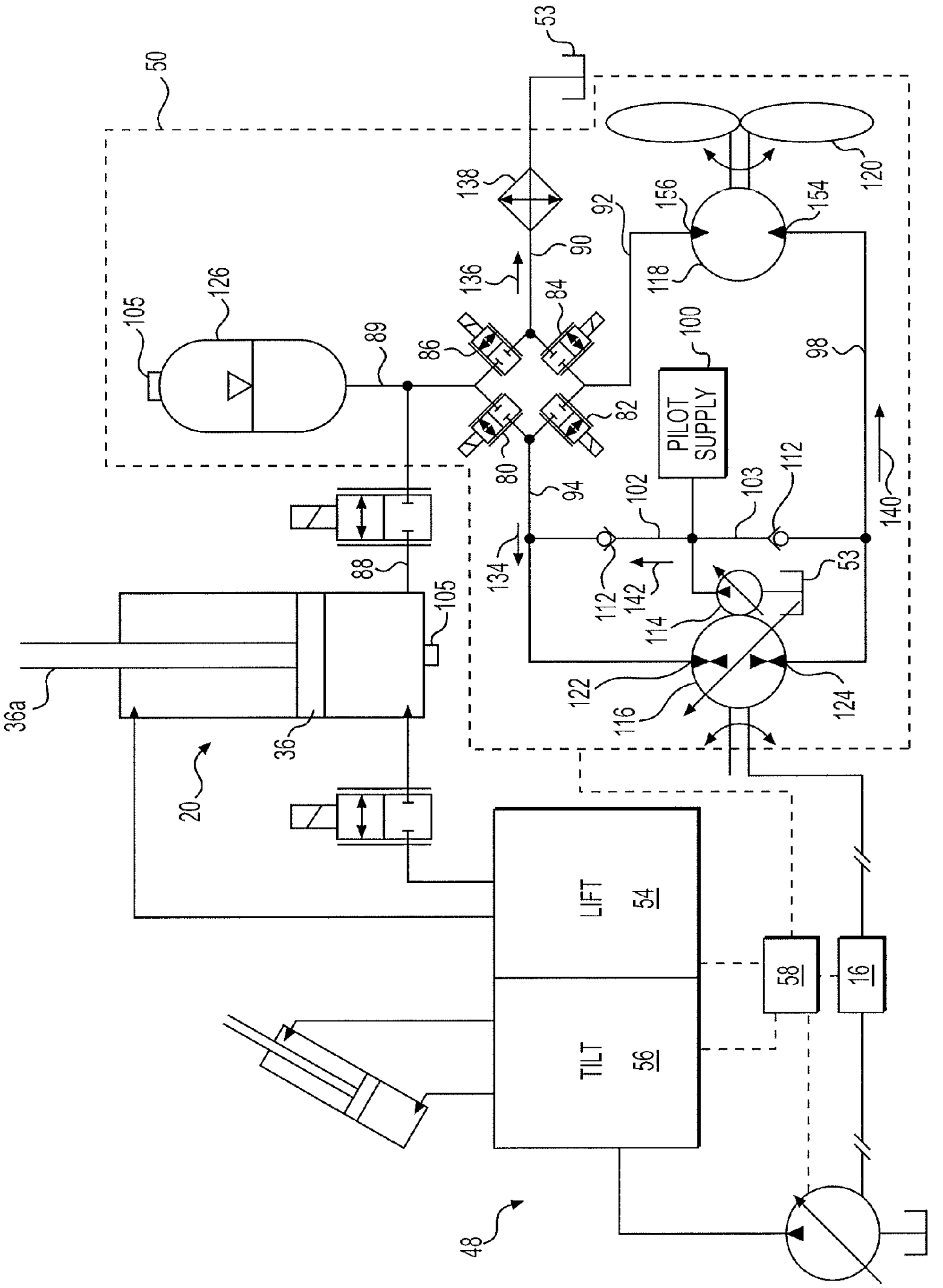
FIG. 3 illustrates another configuration of the exemplary hydraulic and energy recovery systems shown in FIG. 2.
Figure 4:
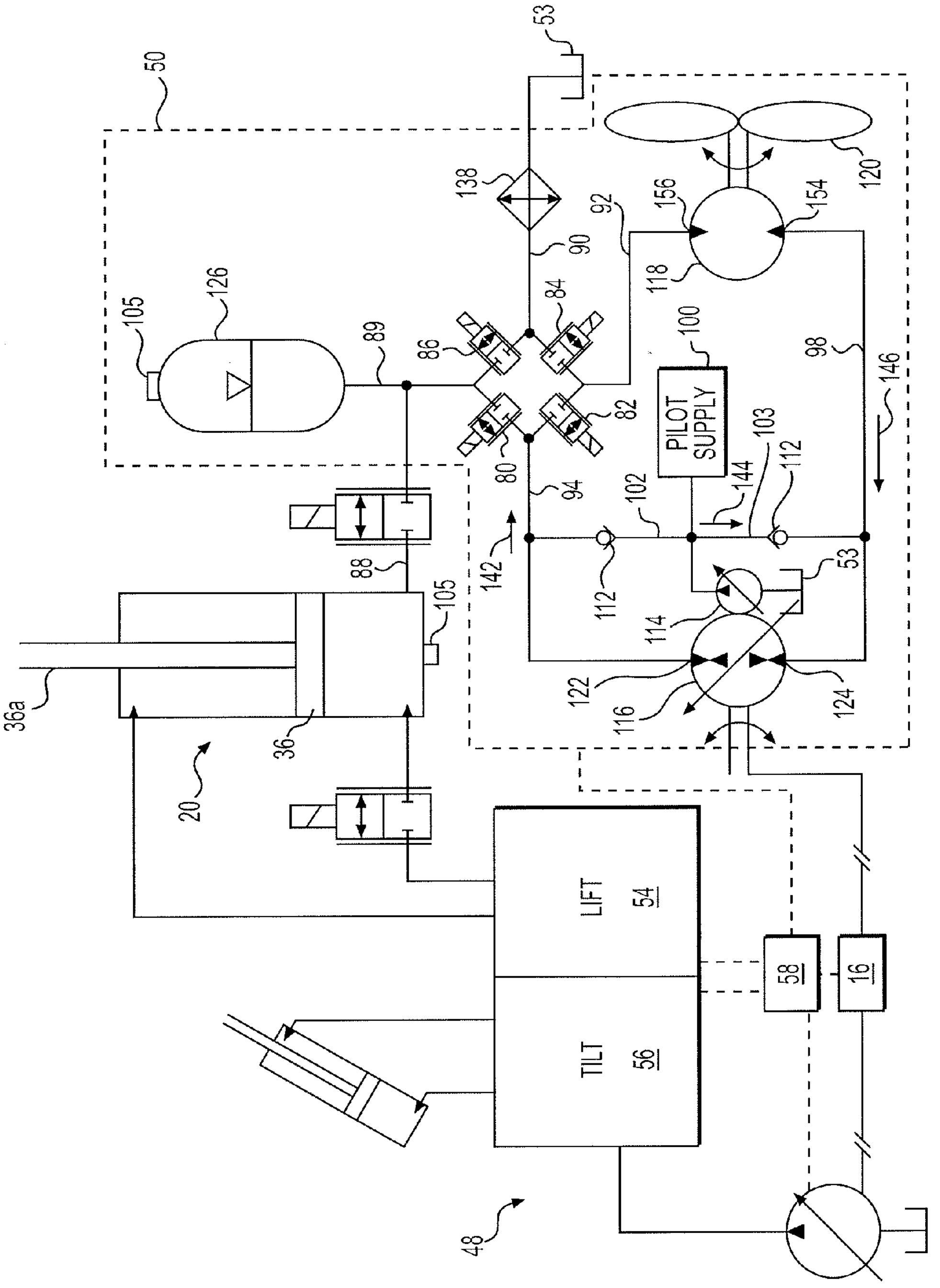
FIG. 4 illustrates a further configuration of the exemplary hydraulic and energy recovery systems shown in FIG. 2.

FIGS. 3 and 4 illustrate additional configurations of the exemplary hydraulic system 48 and energy recovery system 50 discussed herein with respect to FIG. 2, with portions removed for clarity. As shown in FIG. 3, in exemplary embodiments in which accumulator 126 is not used to provide pressurized fluid to pump 116, IMVs 80 and 86 may be operated in a closed position, and charge pump 114 may direct makeup fluid to fluid passage 102 in the direction of arrow 142. Such makeup fluid may pass to fluid passage 94, and may proceed to pump 116 in the direction of arrow 134. Pump 116 may pressurize this fluid and direct the pressurized fluid to inlet 154 of hydraulic motor 118, in the direction of arrow 140, via fluid passage 98. Upon driving hydraulic motor 118, such fluid may pass through fluid passage 92 and open IMV 84 to fluid passage 90. Such fluid may be directed to heat exchanger 138 for cooling, in the direction of arrow 136, via fluid passage 90, and may then return to tank 53.

Additionally, as shown in FIG. 4, in exemplary embodiments fan 120 may be used to periodically remove dirt and/or debris from heat exchanger 138. In such embodiments, a rotation direction of fan 120 and hydraulic motor 118 may be reversed. For example, while fan 120 and hydraulic motor 118 may be configured to rotate in a first or clockwise direction in the embodiments of FIGS. 2 and 3, fan 120 and hydraulic motor 118 may be configured to rotate in a second or counterclockwise direction in the embodiment of FIG. 4. In such an embodiment, fan 120 may be configured to, for example, reverse the direction of air flow across heat exchanger 138 to assist in cleaning heat exchanger 138, and fluid may be blocked from entering heat exchanger 138 via fluid passage 90 during such a cleaning operation. Additionally, during the operation illustrated in FIG. 4, accumulator 126 may not be used to provide pressurized fluid to pump 116. Instead, in such embodiments, IMVs 80 and 86 may be operated in a closed position, and charge pump 114 may direct makeup fluid to fluid passage 103 in the direction of arrow 144. Such makeup fluid may pass to fluid passage 98, and may proceed to outlet 124 of pump 116 in the direction of arrow 146. Pump 116 may pressurize this fluid and direct the pressurized fluid to fluid passage 94 via inlet 122. Such fluid may pass through fluid passage 94, in the direction of arrow 142, and may be directed to fluid passage 92 via IMV 82 operated in an open position. Such fluid may enter hydraulic motor 118 via outlet 156 and may drive hydraulic motor 118 in the reverse direction described above. Hydraulic motor 118 may rotate fan 120 in a corresponding reverse direction, and fluid may exit hydraulic motor 118 via inlet 154. Fluid exiting inlet 154 may be directed back to outlet 124 of pump 116, in a closed-loop manner, via fluid passage 98.

As shown in FIG. 5, in still further embodiments energy recovery system 50 may comprise an open-loop hydraulic circuit. In such embodiments, valve 152 may comprise an IMV configured to direct fluid exiting accumulator 126 to inlet 154 of hydraulic motor 118, and pump 116 may be configured to drive hydraulic motor 118, in an open-loop manner, in response to a signal indicative of accumulator pressure, capacity, and/or other like operating characteristics. For example, pump 116 may provide a pressurized flow of fluid to hydraulic motor 118, and the fluid provided to hydraulic motor 118 by pump 116 may supplement fluid provided to hydraulic motor 118 by accumulator 126.

As with the embodiments shown in FIGS. 2-4, in the embodiment of FIG. 5, controller 58 may receive one or more signals indicative of operating characteristics including, but not limited to, pressure of accumulator 126, and temperatures of hydraulic fluid passing through hydraulic system 48 and/or energy recovery system 50. Such accumulator pressure may vary based on, for example, the amount of fluid disposed within accumulator 126, and such fluid temperatures may comprise, for example, a temperature of hydraulic fluid disposed within tank 53. Based on such inputs, controller 58 may determine an amount of cooling required of fluid passing through heat exchanger 138. For example, controller 58 may compare one or more such temperatures, or an average of such temperatures, to a temperature threshold. If the one or more temperatures or average temperature is above such a threshold, controller 58 may determine, using one or more of the equations, control maps, look-up tables, graphs, or other means described herein, a corresponding fan speed and/or hydraulic motor speed required to reduce the hydraulic fluid temperature to a temperature below the threshold. Controller 58 may direct a control signal to EPRV 150, and EPRV may control pump 116 to provide pressurized fluid to hydraulic motor 118 sufficient to achieve the determined fan speed and/or hydraulic motor speed.

For example, in the embodiment shown in FIG. 5, EPRV 150 may drive pump 116 in response to such control signals received from controller 58, and pump 116 may pressurize fluid from tank 53 and direct the pressurized fluid through fluid passage 94 in the direction of arrow 142. In such exemplary open-loop embodiments, pump 116 may comprise a unidirectional variable displacement pump. Such fluid may combine with fluid provided by accumulator 126, in the direction of arrow 132, via valve 152. The combined flow of fluid may pass to inlet 154 of hydraulic motor 118 via fluid passage 92, and such fluid may drive hydraulic motor 118 and fan 120 at the determined hydraulic motor speed and determined fan speed, respectively. Fluid exiting hydraulic motor 118 may pass through heat exchanger 138 via fluid passage 98, and may then return to tank 53. It is understood that in the embodiment of FIG. 5, the displacement of pump 116 may be adjusted and/or otherwise controlled by EPRV 150 in order to affect a desired flow of fluid from accumulator 26. For example, in order for fluid to pass from accumulator 126 via open valve 152, the pressure in fluid passage 94 must be controlled (by EPRV 150 and pump 116) to be less than the pressure in accumulator 126. Accordingly, in the embodiment of FIG. 5, the release of fluid from and storage of fluid within accumulator 126 may be controlled based on the displacement of pump 116. Likewise, the release of energy from and the storage/recovery of energy by accumulator 126 may be controlled based on the control of EPRV 150.

It will be apparent to those skilled in the art that various modifications and variations can be made to the disclosed embodiments. Other embodiments will be apparent to those skilled in the art from consideration of the specification and practice of the disclosed methods. It is intended that the specification and examples be considered as exemplary only, with a true scope being indicated by the following claims and their equivalents.

What is claimed is:

1. A machine, comprising:

a hydraulic cylinder configured to raise and lower a boom of the machine;

an accumulator selectively fluidly connected to the hydraulic cylinder and configured to receive fluid from the hydraulic cylinder during lowering of the boom;

a hydraulic motor fluidly connected to the accumulator via an independent metering valve, wherein the independent metering valve comprises first and second supply valves, and first and second drain valves, the first supply valve and first drain valve being fluidly connected to a fluid passage extending from the accumulator, and the second supply valve and the second drain valve being fluidly connected to a fluid passage extending from the hydraulic motor; and a fan driven by the hydraulic motor and configured to assist in cooling fluid displaced from the hydraulic cylinder.

2. The machine of claim 1, further including a heat exchanger configured to receive fluid exiting the hydraulic motor, wherein the fan is configured to direct a flow of air across the heat exchanger.

3. The machine of claim 1, further including a pump fluidly connected to the hydraulic motor and driven by a power source of the machine.

4. The machine of claim 3, wherein the pump comprises a unidirectional variable displacement pump fluidly connected to the hydraulic motor in an open-loop manner.

5. The machine of claim 4, wherein the independent metering valve is configured to direct fluid exiting the accumulator to an inlet of the hydraulic motor, and the pump is configured to direct fluid to the inlet in response to a signal indicative of accumulator pressure.

6. The machine of claim 3, wherein the pump comprises a bidirectional variable displacement pump fluidly connected to the hydraulic motor and the independent metering valve in a closed-loop manner.

7. The machine of claim 6, further including a charge pump fluidly connected to the pump, in parallel, the charge pump configured to provide makeup fluid to the pump.

8. The machine of claim 6, wherein the independent metering valve is configured to direct fluid exiting the accumulator to an inlet of the pump, the pump is configured to direct pressurized fluid to the hydraulic motor in order to drive the hydraulic motor, and fluid exiting the hydraulic motor is directed to the independent metering valve.

9. A machine, comprising:

a hydraulic system including a first pump driven by a power source of the machine, and a valve arrangement fluidly connected to the first pump;

a recovery system including a second pump driven by the power source, an independent metering valve fluidly connected to the second pump, an accumulator fluidly connected to the independent metering valve, and a hydraulic motor fluidly connected to the accumulator via the independent metering valve; and a hydraulic cylinder configured to raise and lower a boom of the machine, wherein the hydraulic cylinder is selectively fluidly connected to the valve arrangement of the hydraulic system and the accumulator of the recovery system.

10. The machine of claim 9, further including a first valve regulating flow between the hydraulic cylinder and the valve arrangement, and a second valve regulating flow between the hydraulic cylinder and the accumulator, wherein the second valve is configured to direct fluid from the hydraulic cylinder to the accumulator and the independent metering valve during lowering of the boom.

11. The machine of claim 9, wherein the hydraulic motor is fluidly connected to the second pump, in a closed-loop manner, the second pump is configured to direct pressurized fluid to the hydraulic motor in order to drive the hydraulic motor in a first direction, and fluid exiting the hydraulic motor is directed to the independent metering valve.

12. The machine of claim 11, wherein the independent metering valve directs fluid received from the hydraulic motor to a heat exchanger of the recovery system, the recovery system further including a fan connected to the hydraulic motor and configured to direct a flow of air across the heat exchanger.

13. The machine of claim 11, wherein the second pump is configured to direct pressurized fluid to the hydraulic motor via the independent metering valve in order to drive the hydraulic motor in a second direction opposite the first direction.

14. The machine of claim 13, further including a heat exchanger fluidly connected to the independent metering valve, and a fan connected to the hydraulic motor, wherein the fan is configured to direct a flow of air across the heat exchanger in a third direction in response to the hydraulic motor being driven, in the first direction, and to direct a flow of air across the heat exchanger in a fourth direction opposite the third direction in response to the hydraulic motor being driven in the second direction.

15. The machine of claim 9, wherein the second pump is fluidly connected to the independent metering valve and the hydraulic motor in a closed-loop manner, the recovery system further including a charge pump fluidly connected to the second pump, in parallel, and configured to provide makeup fluid to the second pump.

16. A method of controlling a machine, comprising:

lowering a boom of the machine with a hydraulic cylinder, wherein lowering the boom directs fluid from the hydraulic cylinder to an accumulator;

directing fluid from the accumulator to a pump fluidly connected to the accumulator via an independent metering valve;

directing pressurized fluid from the pump to a hydraulic motor fluidly connected to the independent metering valve; and directing fluid from the hydraulic motor to a heat exchanger via the independent metering valve.

17. The method of claim 16, further including cooling the fluid directed to the heat exchanger with a fan connected to the hydraulic motor.

18. The method of claim 16, further including reversing a flow direction of fluid passing through the hydraulic motor, wherein reversing the flow direction reverses a rotation direction of a fan connected to the hydraulic motor.

19. The method of claim 16, wherein directing fluid from the accumulator to the pump via the independent metering valve reduces a torque demand of the pump.

* * * * *